US00RE41654E

(19) United States
(12) Reissued Patent
Struble et al.

(10) Patent Number: US RE41,654 E
(45) Date of Reissued Patent: Sep. 7, 2010

(54) GARMENT WITH INTERIOR BRA STRUCTURE WITH SIDE SUPPORTS

(75) Inventors: Lisa Powers Struble, Westerville, OH (US); Jami Leigh Anderson Rudolph, Columbus, OH (US); Tiffany Nicole Harris, Columbus, OH (US); Christine Marie Kennedy, Westerville, OH (US); Joshua Andrew Baumer, Worthington, OH (US)

(73) Assignee: A & F Trademark, Inc., Wilmington, DE (US)

(21) Appl. No.: 11/657,109

(22) Filed: Jan. 24, 2007

Related U.S. Patent Documents

Reissue of:
(64) Patent No.: 6,846,217
Issued: Jan. 25, 2005
Appl. No.: 10/679,669
Filed: Oct. 6, 2003

(51) Int. Cl.
*A41C 3/00* (2006.01)

(52) U.S. Cl. ..... 450/31; 450/7; 2/106; 2/78.1
(58) Field of Classification Search ..... 450/30–34, 450/7–11, 60–62, 65, 66, 70; 2/78.1–78.3, 2/105, 106, 73
See application file for complete search history.

(56) References Cited

U.S. PATENT DOCUMENTS

| | | | | |
|---|---|---|---|---|
| 1,750,084 | A | 3/1930 | Abrahamson | |
| 1,844,888 | A | 2/1932 | Lorenz | |
| 1,989,303 | A | 1/1935 | Alberts | |
| 2,782,417 | A | 2/1957 | Magidson | |
| 2,787,790 | A | 4/1957 | Kahn | |
| 2,844,151 | A | 7/1958 | Lemons | |
| 2,864,373 | A | 12/1958 | Buckley | |
| 2,973,763 | A | 3/1961 | Rowell | |
| 3,067,750 | A | 12/1962 | Schwartz | |
| 3,297,035 | A | 1/1967 | Wright | |
| 3,747,606 | A | 7/1973 | Tareau | |
| 3,777,763 | A | 12/1973 | Schwartz | |
| 3,998,231 | A | 12/1976 | Delet | |
| 4,235,240 | A | 11/1980 | Cousins | |
| 4,372,320 | A | 2/1983 | Silber | |
| 4,398,538 | A | 8/1983 | Johnson | |
| 4,646,746 | A | 3/1987 | O'Boyle et al. | |
| 4,699,144 | A | * 10/1987 | Sherwood | 450/54 |
| 4,770,650 | A | 9/1988 | Rowell | |
| 4,781,650 | A | 11/1988 | Budd | |
| 4,956,878 | A | 9/1990 | Boynton | |
| 5,033,986 | A | 7/1991 | Feigenbaum et al. | |

(Continued)

FOREIGN PATENT DOCUMENTS

| | | |
|---|---|---|
| CN | 1554297 | 7/2005 |
| FR | 2730608 | 8/1996 |

(Continued)

*Primary Examiner*—Gloria Hale
(74) *Attorney, Agent, or Firm*—Howrey LLP

(57) ABSTRACT

A women's garment with built-in breast support and no underwire, comprises an exterior fabric layer for covering the torso. A exterior fabric layer has an upper part for at least partly covering the breasts. An interior fabric layer is connected to the upper part of the exterior fabric layer and is sized to extend only over the upper part of the exterior fabric layer on the inner surface thereof cover at least part of the breasts of a woman. A pair of side support panels are connected to the interior fabric layer, each at over one lateral area of the torso, the lateral areas being adjacent respective lateral sides of the breasts and are made of non-stretch material for supporting the breasts. A pair of tapes or other fixing mechanisms are connected to the interior fabric layer and extend along respecting medial edges of the side support panels.

33 Claims, 8 Drawing Sheets

U.S. PATENT DOCUMENTS

| | | | | |
|---|---|---|---|---|
| 5,141,470 | A | 8/1992 | Morgan et al. | |
| 5,219,311 | A | 6/1993 | Fildan | |
| 5,395,280 | A * | 3/1995 | Greenberg | 450/54 |
| 5,527,202 | A | 6/1996 | Morgan et al. | |
| 5,678,246 | A | 10/1997 | Cooley et al. | |
| 5,730,640 | A | 3/1998 | Acx et al. | |
| 5,951,365 | A | 9/1999 | Fildan | |
| 6,053,800 | A | 4/2000 | Lattanzi | |
| 6,190,232 | B1 | 2/2001 | Boser | |
| 6,241,576 | B1 | 6/2001 | Hofer | |
| 6,299,504 | B1 | 10/2001 | Gluckin | |
| 6,346,028 | B1 | 2/2002 | Fildan et al. | |
| 6,431,946 | B1 | 8/2002 | Fildan et al. | |
| 6,435,939 | B1 | 8/2002 | Lin | |
| 6,443,805 | B1 | 9/2002 | Kirkwood | |
| 6,447,365 | B1 | 9/2002 | Powell et al. | |
| 6,796,876 | B2 | 9/2004 | Luk | |
| 6,805,610 | B2 | 10/2004 | Luk | |
| 6,805,611 | B2 | 10/2004 | Luk | |
| 6,805,612 | B1 | 10/2004 | Luk | |
| 6,811,464 | B2 | 11/2004 | Li | |
| 6,824,444 | B2 | 11/2004 | Huang | |
| 6,837,772 | B1 | 1/2005 | Luk | |
| 6,846,217 | B1 * | 1/2005 | Struble et al. | 450/31 |
| 6,857,933 | B2 | 2/2005 | Horta et al. | |
| 6,857,934 | B2 | 2/2005 | Chan | |
| 6,878,033 | B2 | 4/2005 | Luk | |
| 6,899,590 | B2 | 5/2005 | Luk | |
| 6,966,815 | B2 | 11/2005 | Weinerth | |
| 6,986,696 | B1 | 1/2006 | Jagaric et al. | |
| 6,986,697 | B2 | 1/2006 | Luk | |
| 7,032,626 | B2 | 4/2006 | Glenn et al. | |
| 2003/0134568 | A1 | 7/2003 | Bark | |
| 2004/0224604 | A1 | 11/2004 | Luk | |
| 2005/0014450 | A1 | 1/2005 | Luk | |
| 2005/0197043 | A1 | 9/2005 | Horta et al. | |
| 2005/0272345 | A1 | 12/2005 | Lau | |
| 2006/0141905 | A1 | 6/2006 | Lau | |

FOREIGN PATENT DOCUMENTS

| | | |
|---|---|---|
| JP | 02091202 | 3/1990 |
| JP | 8144150 | 6/1996 |
| JP | 09031795 | 2/1997 |
| JP | 2000054204 | 2/2000 |
| JP | 2001288604 | 10/2001 |
| JP | 2001295108 | 10/2001 |
| JP | 2002235210 | 8/2002 |
| JP | 2003301355 | 10/2003 |
| JP | 2004316042 | 11/2004 |
| JP | 2005076138 | 3/2005 |

* cited by examiner

FIG. 5
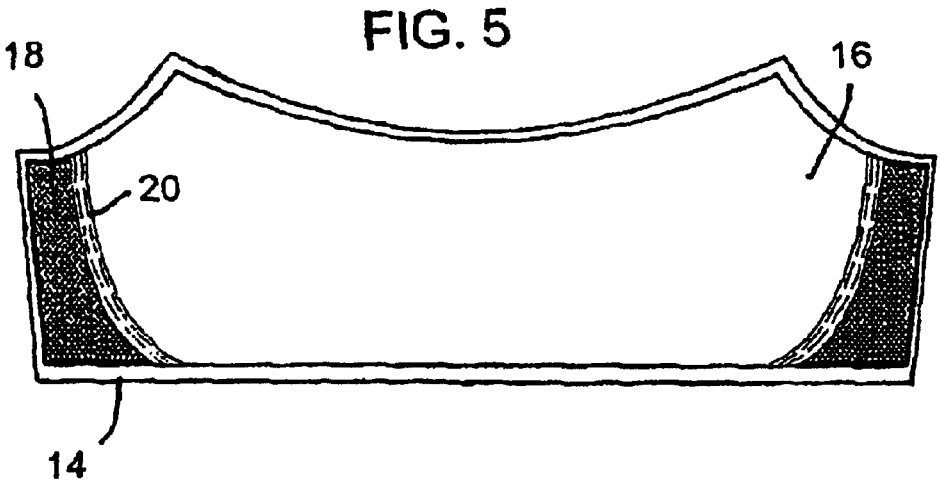
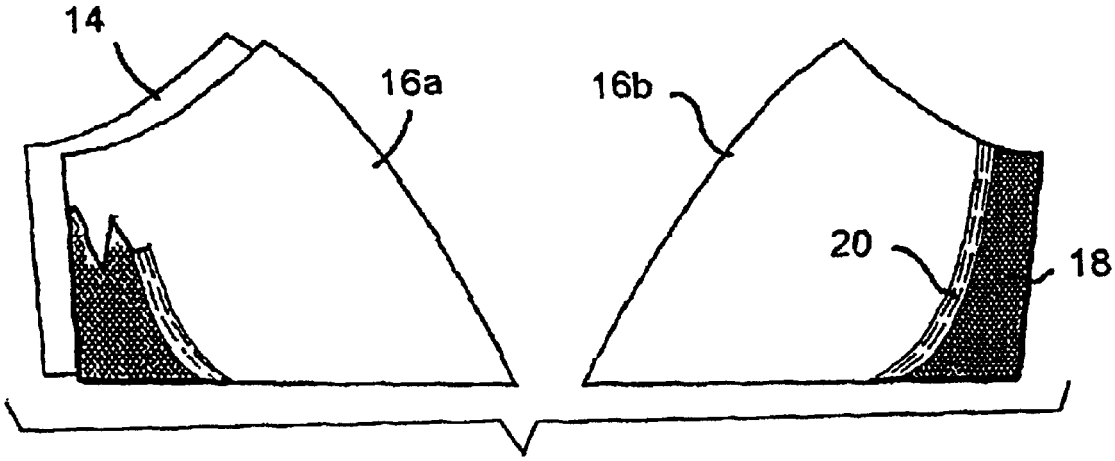
FIG. 6

GARMENT WITH INTERIOR BRA STRUCTURE WITH SIDE SUPPORTS

Matter enclosed in heavy brackets [ ] appears in the original patent but forms no part of this reissue specification; matter printed in italics indicates the additions made by reissue.

FIELD AND BACKGROUND OF THE INVENTION

The present invention relates generally to the field of women's garments, and, in particular, to a new and useful garment for covering at least the upper body, such as a camisole, that includes an interior bra structure with non-stretching side panels for firmly yet gently supporting the breasts without the need for underwires or padding.

Known camisoles with extra breast support used a simple interior bra (often called a shelf-bra) built into camisoles. Interior bras are desirable because the wearer has some support without the need for a separate bra that may not be compatible with the outer layer camisole (neckline shape, straps, etc). Previous shelf-bras, however, minimize the wearer's bustline, making the cup size appear smaller and less flattering than a separate bra. In essence, these prior structures solved one problem but created another.

Another previous structure is a true built-in bra, that is, an actual bra that is attached permanently to the camisole. While these bras work, the cups, padding, and underwire restrict and limit the market because they only fit specific bust sizes. The padding typically used creates an unnatural and often "lumpy" appearance and many of these devices show through the outer body of the garment, distorting the overall appearance.

U.S. Pat. No. 2,510,012 to Edelman disclosed a woman's garment with a built-in, underwire bra for support. Slips with bra structure are disclosed in U.S. Pat. No. 2,558,420 to D'Amato; U.S. Pat. No. 3,343,545 to Kress; and U.S. Pat. No. 3,565,081 to Barg.

U.S. Pat. No. 4,372,320 to Siber discloses a garment with a built-in bust support in the form of a torso-encircling band arrangement sewn into the front of the garment and extending under the breasts of a wearer of the garment.

An integrally formed garment for female wear which is adapted to lend shaping to the figure of a woman but which eliminates the need for a brassiere is also disclosed in U.S. Pat. No. 4,590,945 to Fiel. Also see U.S. Pat. No. 4,798,557 to Scott for a camisole with underwire bra garment, and U.S. Pat. No. 5,033,986 to Feigenbaum et al. for a woman's bodysuit for exercising or swimming, comprises an outer covering for encasing at least a portion of a woman's torso, including the bust, abdomen, hips and rear regions, with an incorporated bra-like structure.

A camisole embodying brassiere cups joined with a separate stretchable strip laterally placed at the base of brassiere cups is disclosed by U.S. Pat. No. 5,045,018 to Costanzo. Also see U.S. Pat. No. 6,530,820 to Katze et al. for a garment with an underwire bra structure therein, and U.S. Pat. No. 6,443,805 to Kirkwood for a bra shelf and application thereof in a camisole and similar garments.

A need remains for a camisole or other similar garment for the torso of a woman, which includes breast support without underwires and without extra padding, while maintaining a flattering natural shape to the bustline without minimizing the bust.

SUMMARY OF THE INVENTION

It is an object of the present invention to provide a camisole or like garment such as a slip or other woman's garment for at least covering the torso, which includes soft inner structures that support the breasts without flattening them and without the use of underwires or padding.

Accordingly, another object of the invention is to provide a women's garment with built-in breast support and no underwire, comprising an exterior fabric layer for covering at least the torso of a woman wearing the garment, the exterior fabric layer having inner and outer surfaces. The exterior fabric layer has a rear portion for covering the back or rear of the torso. An interior fabric layer is connected to the upper part of the exterior fabric layer and is sized to extend only under the upper part of the exterior fabric layer on the inner surface of the exterior fabric layer to cover at least part of the breasts. A pair of side support panels are connected to the interior fabric layer, each side support panel being sized to extend only over one lateral area at the side and front of the torso, the lateral areas being adjacent respective lateral sides of the breasts of the woman wearing the garment. Each side support panel is made of non-stretch and flexible material for supporting the breasts, in a medial (that is central) direction and forwardly or outwardly. A pair of tapes are preferably connected to the interior fabric layer and extend along respecting medial edges of the side support panels for attaching the side support panels to the interior fabric layer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a view similar to FIG. 4 of another embodiment of the invention;

FIG. 6 is a view similar to FIG. 4 of a still further embodiment of the invention with one of the side support panels cut away;

DESCRIPTION OF THE PREFERRED EMBODIMENTS

Figure 1:
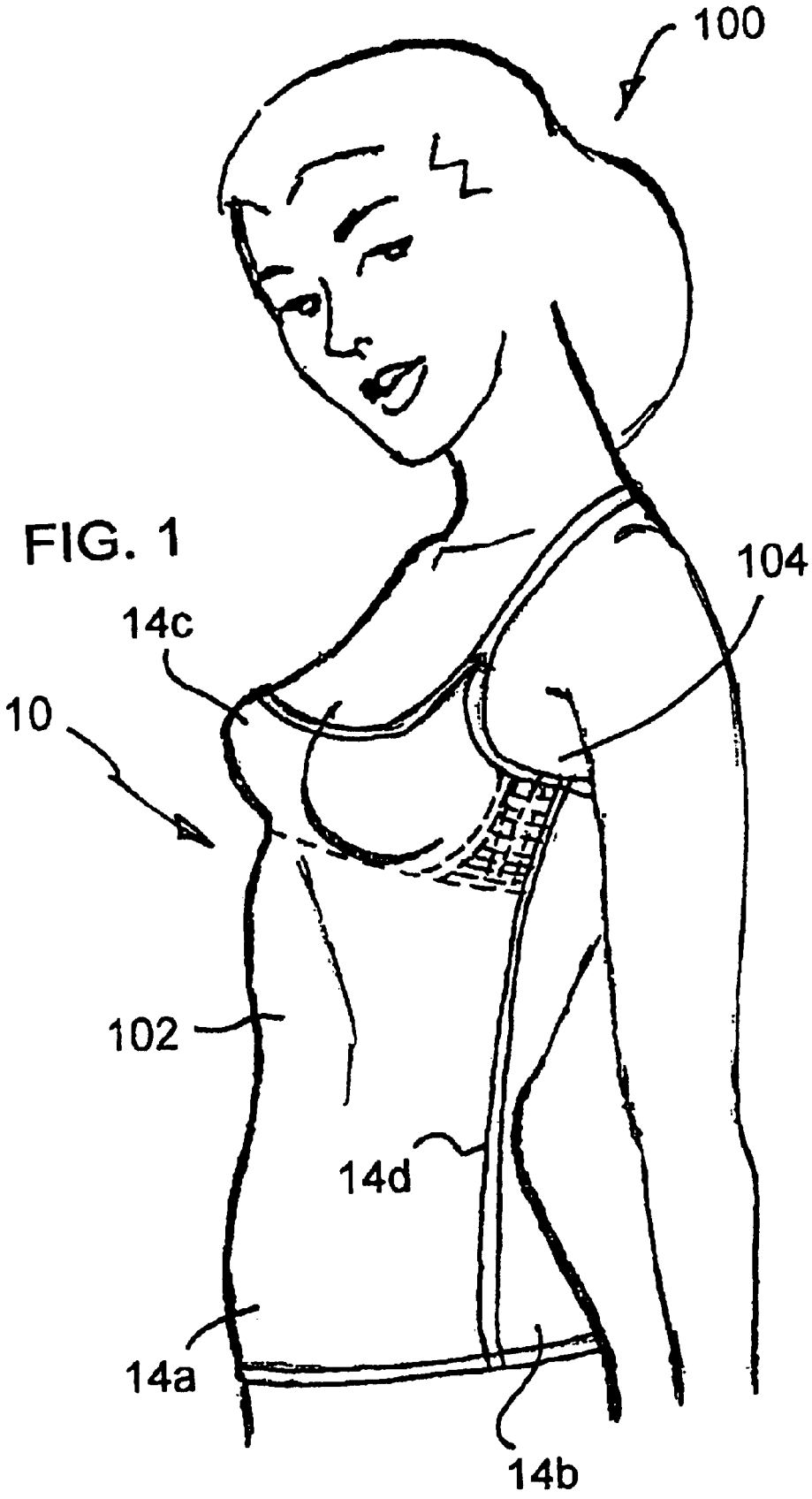
FIG. 1 is a perspective view of a woman wearing a garment of the present invention.
Figure 2:
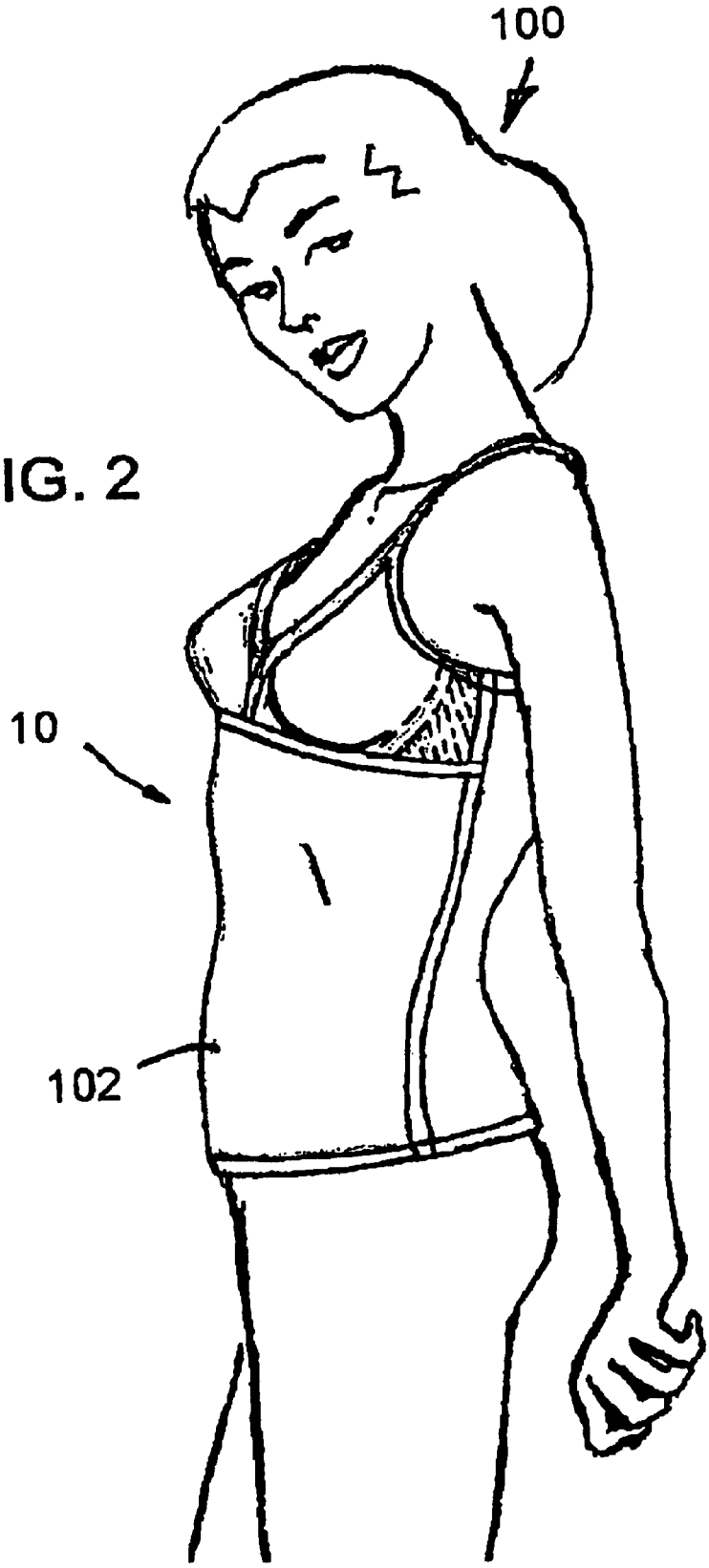
FIG. 2 is a view similar to FIG. 1 of a woman wearing a garment of another embodiment of the present invention.

Referring now to the drawings, in which like reference numerals are used to refer to the same or similar elements, FIG. 1 shows a sportswear camisole 10 with interior bra side supports. Although similar constructions are used in actual foundation bras that are sold separately from the outer camisole, such a side support arrangement has not been used in a built-in shelf-bra such as the invention disclosed here, that is, permanently attached to the outer garment. While many garments have built-in bras, the inventors are aware of none that contain side support appliques. Most have underwires, enclosed padding, or simple interior bras (commonly self fabric with bottom elastic and no other support devices).

The side supports of the invention are believed to be unique in that they push and hold the bustline forward, without padding or underwire. They are a "bust enhancing" feature that is almost invisible from the exterior. This arrangement does not restrict or limit bust size. Such limitations occur when using underwire. Nor does it cause the bustline to appear unnatural, as is often the case with padding. Shelf-bras typically minimize the bustline by pushing the breasts flat and outwardly, that is laterally toward the underarms. The side panels of the invention support and hold the bust forward. They provide support and shape to breasts while maintaining a natural appearance as there is only a thin layer of fabric covering the breasts—no padding, no hard wires, no seams.

Figure 3:
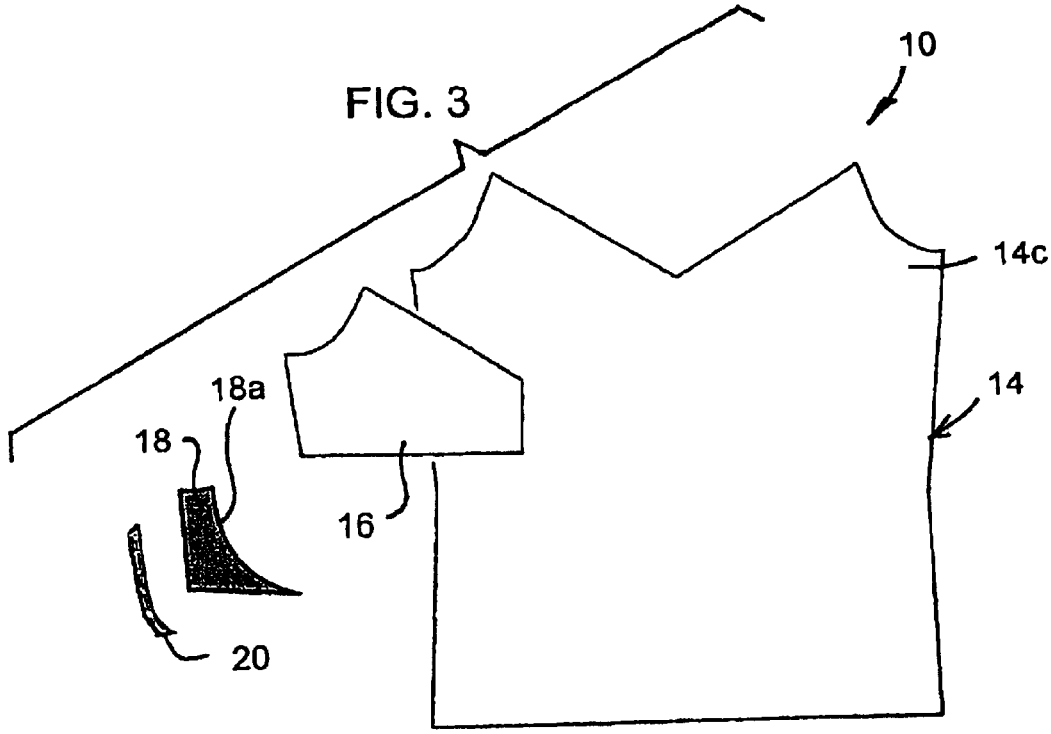
FIG. 3 is an exploded, interior view of the garment of the invention with the parts for only one side illustrated.

Referring to FIG. 3, the garment 10 of the present invention may or may not contain additional components than those listed, but will always include the following:

an exterior body in the form of an exterior fabric layer 14;

an interior fabric layer 16;

an interior non-stretch fabric forming a side support panel 18; and a substantially continuous seam attachment, taping or tape 20 for connecting the panel 18 to the interior fabric layer 16.

In greater detail and with reference to FIGS. 1, 2, 3 and 4, the invention is a women's garment 10 with built-in breast support and no underwire, which comprises the exterior fabric layer 14 for covering at least the torso 102 of a woman 100 wearing the garment, the exterior fabric layer 14 having inner and outer surfaces and a front portion 14a for covering a torso front of the woman, the front portion having an upper part 14c for at least partly covering the breasts of the woman. The exterior fabric layer also has a rear portion 14b, connected to the front portion 14a, e.g. along a pair of side seams 14d, for covering the rear of the torso of the woman wearing the garment.

The interior fabric layer 16 is connected to the upper part 14c of the exterior fabric layer 14, and is sized to extend only over the upper part of the exterior fabric layer. It is placed on the inner surface of the exterior fabric layer to cover at least part of the breasts of the woman.

The pair of side support panels 18 are connected to the interior fabric layer 16. Each side support panel 18 is sized to extend only over one lateral area 104 of the side of the woman's torso, toward the front and near the underarms. This may include lateral portions of the woman's breasts, depending the breast size and shape of the particular woman wearing the garment. In any case, these lateral areas are adjacent respective lateral sides of the breasts of the woman.

Each side support panel is made of non-stretch and flexible material for supporting the breasts, in a medial (that is toward the centerline of the body) direction and forwardly and outwardly to flatter and shape the breasts instead of flattening them.

The pair of tapes 20 are connected to the interior fabric layer and extend along respecting medial edges 18a of the side support panels 18 for reinforcing the breast support and shaping provided by the side support panels. The tapes 20 are concavely curved downwardly and medially along the medial edge 18a of each respective side support panel 18. Alternatively, a substantially continuous seam, stitch, adhesive or other fixing means can be used along each edge 18a to connect that edge to the interior fabric layer 16.

As noted the material of the panels 18 is non-stretch and can be, for example, tricot, that is, a plain warp-knitted fabric as of nylon, wool, rayon, silk, or cotton, with a close or far inelastic knit. Panel 18 may alternatively be mesh, netting, woven, non-woven or any other flexible material that substantially does not stretch in either orthogonal direction. The exterior and interior fabric layers 14 and 16 may, and usually will have stretch qualities and can be made of any suitable material known to those skilled in the art of clothing manufacturing.

Either the same fabric (the norm) or different fabric can be used for layers 14 and 16. For example, interior layer 16 may have some spandex or other elastic fiber content (e.g. 2–3% or as much as B-9%) for stretch characteristics, and the exterior layer 14 may also have an elastic fiber content. For lighter exterior layer fabrics, heavier interior layer fabric 16 is used to provide sufficient breast support, and conversely, if the exterior fabric layer 14 is heavy enough, a light interior fabric layer can be used. The skilled artisan in this field will select the fabric combination that is appropriate to the use and character of the garment, while benefitting from the present invention.

Figure 4:
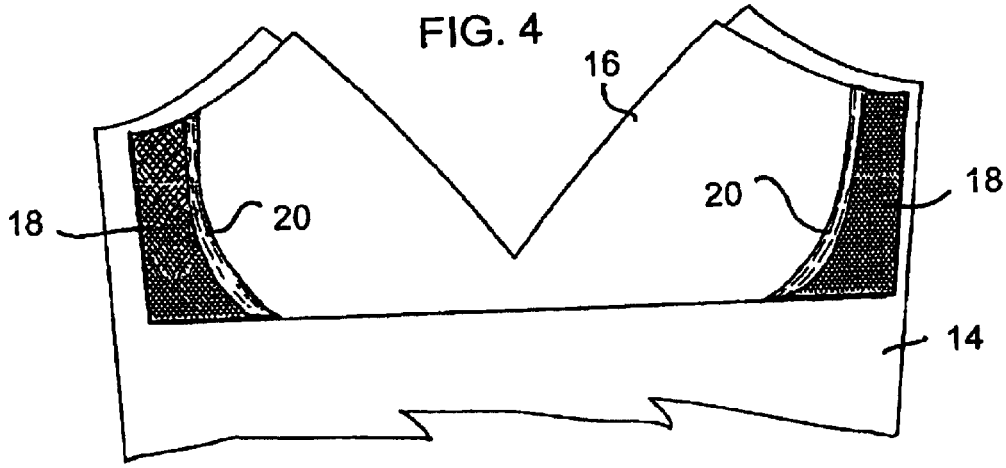
FIG. 4 is a partial, interior elevational view of the assembled garment of the invention shown in FIG. 3
Figure 14:
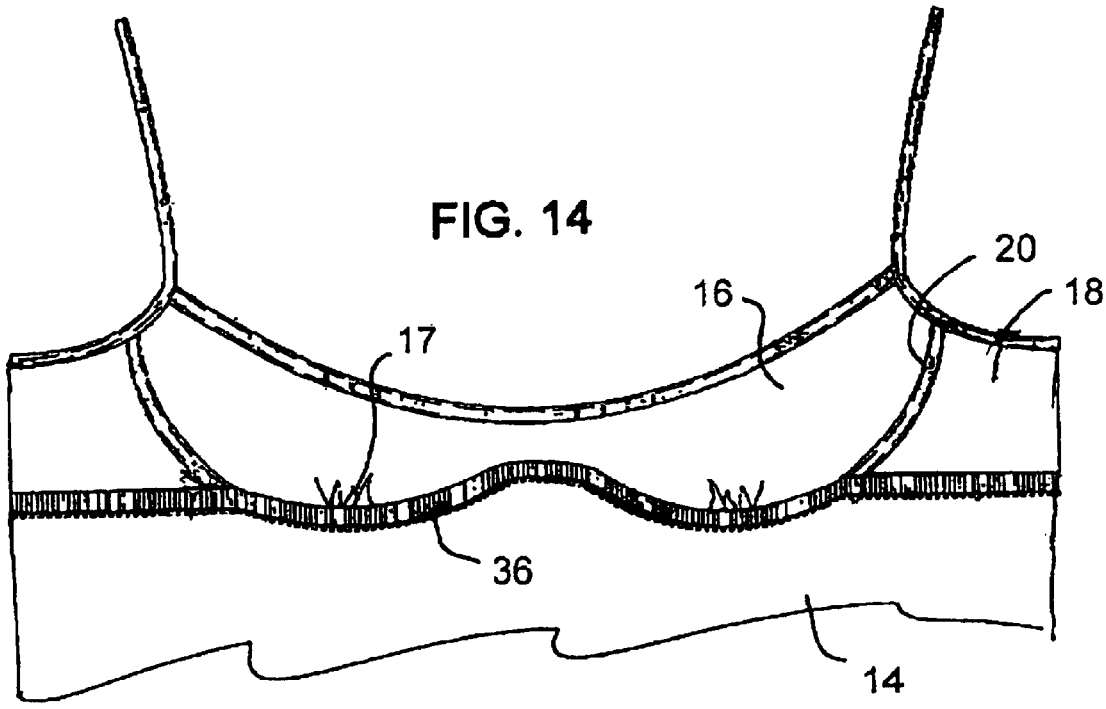
FIG. 14 is a partial, interior elevational view of another embodiment of the invention.

The interior fabric layer may comprise two interior fabric panels 16a and 16b as illustrated in FIG. 6, or one panel as shown in FIGS. 4, 5 and 14, but each with a neck line and armhole that aligns with or generally follows that of the exterior layer 14.

The method of manufacturing the garment of the invention, as illustrated in FIG. 3, is the same for both sides of the garment.

Firstly, the non-stretch panel 18 is applied to the sides of interior fabric layer 16, along with the tape 20 or other fixing means, in generally one operation. The non-stretch panels are to be against the wearer's skin, or at least face the woman, when the garment is worn. The panels are not inset nor is the attaching seam stitched through to the exterior body fabric 14. This construction makes the side supports 18 virtually invisible from the exterior.

The non-stretch panels 18 are stabilizing points that hold and push the bustline forward.

The medial or inner edges 18a of each panel should be curved to follow the bust shape. This shaping allows the breasts to maintain a natural shape, instead of minimizing the bustline.

The taping or tapes 20, which are preferably folded fabric, are set with a ¼", 2 needle stitch that straddles the inner edge 18a of the panel to be applied. This creates added security and support with minimal fabric bulk.

The actual height and width measurements of the panel may vary by fabrication, size and exterior garment styling. The overall shape and construction remains the same, however.

Figure 12:
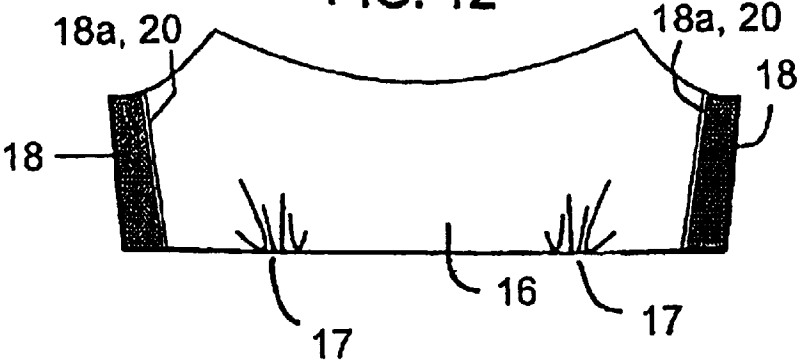
FIG. 12 is a view similar to FIG. 4 of an embodiment of the invention with shirred areas for the center of each breast.

The interior side support panel system of the present invention is an improvement to the basic shelf-bra because it pushes the bustline forward creating a fuller cup, rather than pressing the breasts flat. In addition to enhancing the appearance of the bustline, it also provides needed support to the breast since the panels and tape may curve partly under the breasts. This increases the comfort and wearability of the camisole or other torso covering garment of the present invention. The inner or medial edges 18a and their fixing means 20, may alternatively be straight, as shown in FIG. 12, for example.

The side support panels are an improvement over prior art, build-in bra constructions, because they are virtually invisible from the exterior and so they do not detract from the appearance of the outer camisole. Previous support devices such as padding and underwire are visible through the outer camisole, detracting from the intended design.

Garments that embody the present invention were fit and wear-tested and compared to various internal bra versions and other versions of camisole garment. The present invention with interior side supports was the only one that met the criteria of bust size versatility, natural shape, fuller looking cups, added support, comfort and low visibility of the support mechanism.

Construction variations to the interior "bra" structure of the invention due to stylistic changes in the exterior body can be accommodated within the principles of the invention (i.e. the side support construction remains as claimed).

Figure 9:
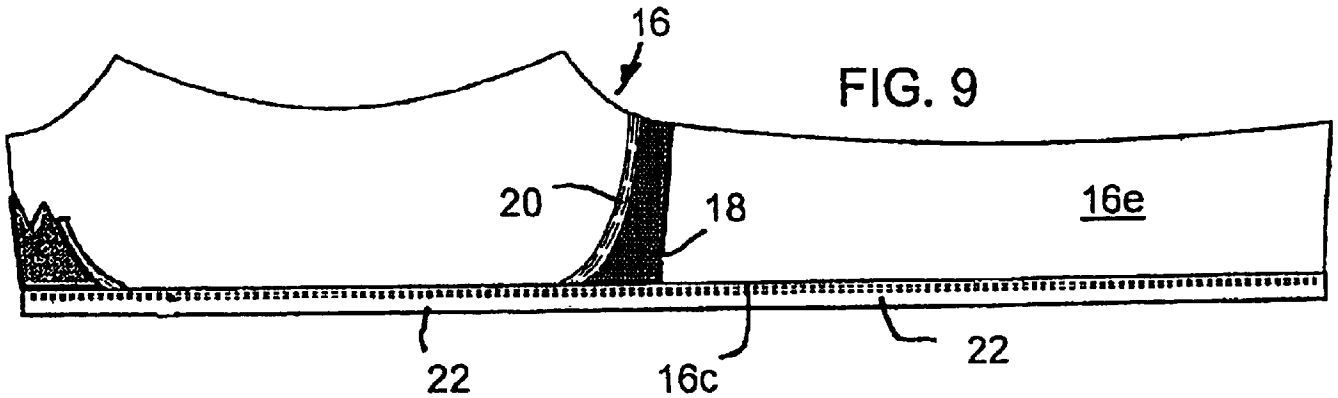
FIG. 9 is a view similar to FIG. 4 of another embodiment of the invention with an interior back panel and elastic trim band extending along lower edges of the entire interior layer.

FIG. 9 illustrates a free-hanging bra structure 16 to be attached to the exterior fabric layer body (not shown) at the neckline and armholes, but not at the bottom edge 16c. The interior fabric layer 16 also includes a front bra panel with side supports 18, 20 and a separate back bra panel 16e. Both front and back panels, have bottom bra elastic 22 sewn at their lower edge or margin 16c, that is meant to extend around the woman's torso, at a line below the breasts.

FIG. 6 illustrates an embodiment of the invention with lined front cups only, with the side supports and no bottom elastic and no back bra panel. A lined front panel only with side supports, no bottom elastic and no back bra panel is illustrated in FIG. 5.

Figure 7:
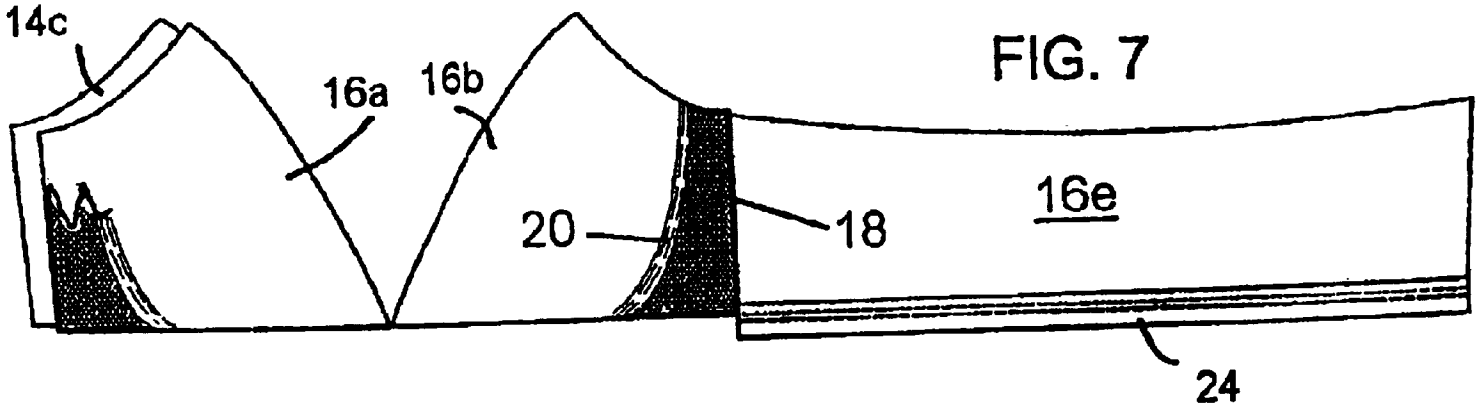
FIG. 7 is a view similar to FIG. 4 of another embodiment of the invention with an interior back panel and elastic trim band.

FIG. 7 shows an embodiment of the invention with a two-part interior fabric layer forming lined front cups with side supports but no bottom elastic. A separate, free-hanging back bra panel 16e with bottom elastic 24 that is not attached at the lower edge or margin is also present in this embodiment. In this figure, reference numeral 20 is used to illustrate a continuous seam along the medial edge of panel 18, without tape.

Figure 8:
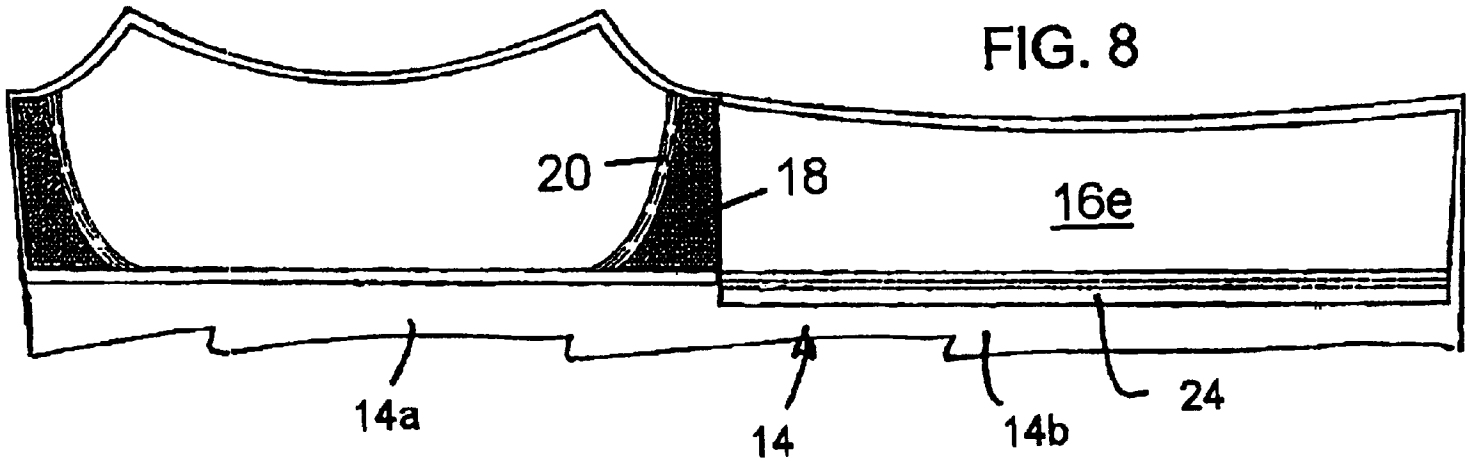
FIG. 8 is a view similar to FIG. 4 of a still further embodiment of the invention with an interior back panel and elastic trim band.

A one part interior fabric layer forming the lined front panel with side supports and no bottom elastic is shown in FIG. 8. A separate free-hanging back bra panel 16e with bottom elastic 24 is present and the front and rear portions 14a, 14b, of the exterior fabric layer 14 is also visible.

Figure 10:
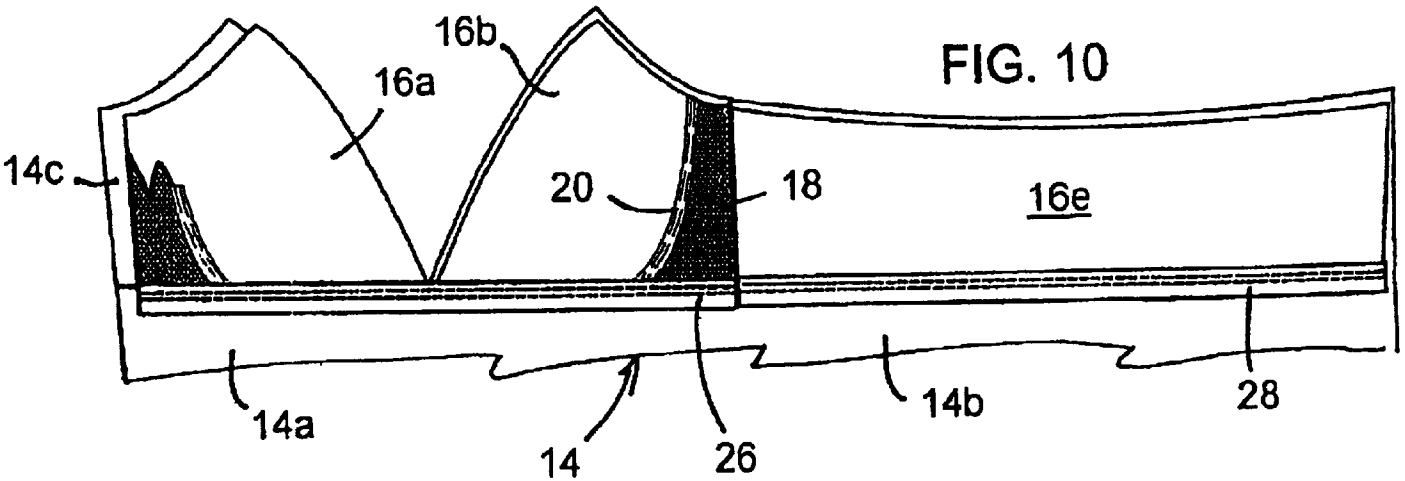
FIG. 10 is a view similar to FIG. 4 of another embodiment of the invention with an interior back panel and elastic trim band along the entire lower edge of the interior layer.

FIG. 10 illustrates lined front cups in a two piece interior fabric layer 16a, 16b, with side supports 18, 20 and bottom elastic 26. A separate, free-hanging back bra panel 16e with free bottom elastic 28 is also provided as well as a top edge treatment at the neck line and armhole of the garment.

Figure 11:
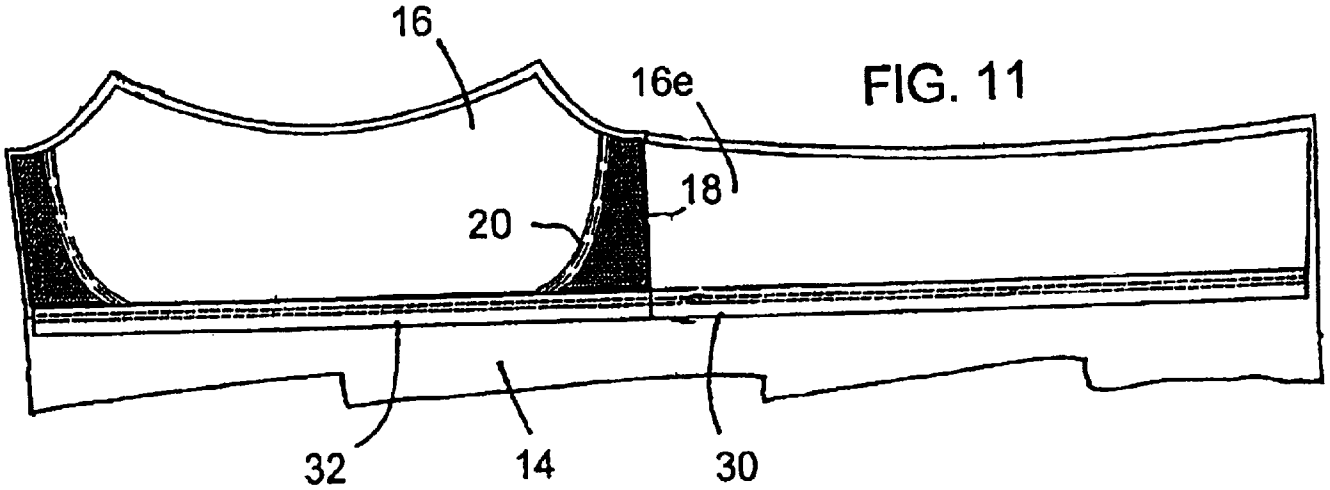
FIG. 11 is a view similar to FIG. 10 of another embodiment of the invention.

A lined front panel 16 with side supports 18, 20 and bottom elastic 32 is shown in FIG. 11. A separate free-hanging back bra panel 16e with bottom elastic 30 is also present.

Figure 13:
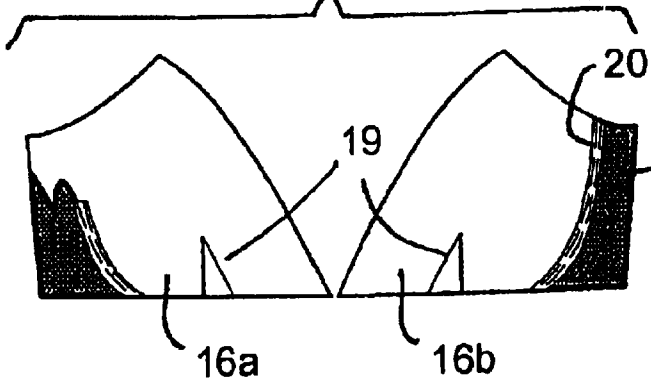
FIG. 13 is a view similar to FIG. 4 of an embodiment of the invention with a dart for the center of each breast.

FIGS. 12 and 13 illustrate a front bra panel 16 or cups 16a, 16b, that are shirred at 17 or have a dart 19 near the center of each breast and starting at the lower edge of the interior fabric layer, and with the side supports of the invention.

FIG. 14 illustrates the invention applied to a garment with a one-piece interior fabric layer 16, having a lower edge 36, e.g. of ⅜" elastic with 2NC w/fuzzy side toward the body. The lower edge 36 has convex curved sections below each breast for added support and a central concave curve for better breast separation. The side parts of the edge are substantially straight to extend around the sides and back of the torso. The neck line and armholes are finished and shoulder straps are shown for supporting the garment from the wearer's shoulders. Shirred areas 17 are used at the lower center of each breast areas, and only part of the exterior fabric layer 14 is shown in FIG. 14.

While specific embodiments of the invention have been shown and described in detail to illustrate the application of the principles of the invention, it will be understood that the invention may be embodied otherwise without departing from such principles.

What is claimed is:

1. A women's garment with built-in breast support and no underwire, comprising:

an exterior fabric layer for covering at least the torso of a woman wearing the garment, the exterior fabric layer having inner and outer surfaces and a front portion for covering a torso front of a woman wearing the garment, the front portion having an upper part for at least partly covering the breasts of a woman wearing the garment, the exterior fabric layer also having a rear portion connected to the front portion for covering a torso rear of a woman wearing the garment;

an interior fabric layer connected to the upper part of the exterior fabric layer and sized to extend only over the upper part of the exterior fabric layer on the inner surface of the exterior fabric layer to cover at least part of the breasts of a woman wearing the garment;

a pair of side support panels connected to the interior fabric layer, each side support panel being sized to extend only over one lateral area of a torso front of a woman wearing the garment, the lateral areas being adjacent respective lateral sides of the breasts of a woman wearing the garment, each side support panel being made of non-stretch and flexible material for supporting the breasts of a woman wearing the garment, in a medially direction and forwardly; and a pair of fixing means for connecting the interior fabric layer to each side support panel, along respective medial edges of the side support panels for reinforcing breast support provided by the side support panels.

2. The women's garment according to claim 1, wherein each of the fixing means is a tape which is curved downwardly and medially along the medial edge of each respective side support panel.

3. The women's garment according to claim 1, wherein the interior fabric layer comprises two interior fabric panels each for covering at least part of one breast of a woman wearing the garment.

4. The women's garment according to claim 1, wherein the interior fabric layer comprises one interior fabric panel for covering at least part of the breasts of a woman wearing the garment.

5. The women's garment according to claim 1, wherein upper margins of the exterior and interior fabric layers are connected to each other at a neck line and armhole of the garment, the interior fabric layer having a lower edge located along a torso line on a woman wearing the garment, below the breasts, each tape extending from the upper margin to the lower edge of a respective interior fabric layer.

6. The women's garment according to claim 1, wherein the interior fabric layer has an outer surface facing the inner surface of the exterior fabric layer, and an inner surface on which each side support panel is disposed.

7. The women's garment according to claim 1, wherein each side support panel and each fixing means is connected to the interior fabric layer by stitches which do not extend to the exterior fabric layer so that the side support panels and fixing means are not apparent at the outer surface of the exterior fabric layer.

8. The women's garment according to claim 1, wherein upper margins of the exterior and interior fabric layers are connected to each other at least along a neck line of the garment, the interior fabric layer having a lower edge located along a torso line on a woman wearing the garment, below the breasts, the lower edge of the interior fabric layer not being connected to the exterior fabric layer, each fixing means comprising a tape extending from the upper margin to the lower edge of the interior fabric layer, each side support panel and each tape being connected to the interior fabric layer by stitches which do not extend to the exterior fabric layer so that the side support panels and tapes are not apparent at the outer surface of the exterior fabric layer.

9. The women's garment according to claim 1, wherein upper margins of the exterior and interior fabric layers are connected to each other at a neck line of the garment, the interior fabric layer having a lower edge located along a torso line on a woman wearing the garment, below the breasts, the lower edge of the interior fabric layer being connected to the exterior fabric layer by stitches, each fixing means extending from the upper margin to the lower edge of the interior fabric layer, each side support panel and each fixing means being connected to the interior fabric layer by stitches which do not extend to the exterior fabric layer so that the side support panels and fixing means are not apparent at the outer surface of the exterior fabric layer.

10. The women's garment according to claim 1, wherein the interior fabric layer includes a front panel that is connected to the side support panels and fixing means, and a back panel connected to opposite sides of the front panel for extending across the torso back of a woman wearing the garment.

11. The women's garment according to claim 1, wherein the interior fabric layer includes a front panel that is connected to the side support panels and fixing means, and a back panel connected to opposite sides of the front panel for extending across the torso back of a woman wearing the garment, the front and back panels each having lower edge, and an elastic trim band connected to and extending along the lower edge of at least one of the front and back panels.

12. The women's garment according to claim 1, wherein the interior fabric layer includes a front panel that is connected to the side support panels and tapes forming said fixing means, and a back panel connected to opposite sides of the front panel for extending across the torso back of a woman wearing the garment, the front and back panels each having lower edge, and an elastic trim band connected to and extending along the lower edge of each of the front and back panels.

13. The women's garment according to claim 1, wherein the interior fabric layer includes a front panel that is connected to the side support panels and tapes forming said fixing means, and a back panel connected to opposite sides of the front panel for extending across the torso back of a woman wearing the garment, the front and back panels each having lower edge, and an elastic trim band connected to and extending along the lower edge of each of the front and back panels, the trim band of the lower edge of the front panel being connected to the exterior fabric layer and the lower edge of the rear panel not being connected to the exterior fabric layer.

14. The women's garment according to claim 1, wherein the interior fabric layer is shirred near a lower edge thereof, at a pair of locations centered on each breast of a woman wearing the garment.

15. The women's garment according to claim 1, wherein the interior fabric layer includes a dart near a lower edge thereof, at a pair of locations centered on each breast of a woman wearing the garment.

16. The women's garment according to claim 1, wherein the interior fabric layer has upper and lower margins and a pair of lateral edges, each side support panel having substantially straight upper and lower margins and a lateral edge connected to and over an inner surface of the interior fabric layer along the respective upper and lower margins and one lateral edge of the interior fabric layer, each fixing means being at least partly concavely curved along the medial edge of each respective side support panel.

17. The women's garment according to claim 16, wherein the interior fabric layer comprises two interior fabric panels each for covering at least part of one breast of a woman wearing the garment.

18. The women's garment according to claim 16, wherein the interior fabric layer comprises one interior fabric panel for covering at least part of the breasts of a woman wearing the garment.

19. The women's garment according to claim 16, wherein the interior fabric layer includes a front panel that is connected to the side support panels and fixing means, and a back panel connected to opposite sides of the front panel for extending across the torso back of a woman wearing the garment.

20. A method of manufacturing a women's garment with built-in breast support and no underwire, comprising:

providing an exterior fabric layer for covering at least the torso of a woman wearing the garment, the exterior fabric layer having inner and outer surfaces and a front portion for covering a torso front of a woman wearing the garment, the front portion having an upper part for at least partly covering the breasts of a woman wearing the garment, the exterior fabric layer also having a rear portion connected to the front portion for covering a torso rear of a woman wearing the garment;

connecting an interior fabric layer to the upper part of the exterior fabric layer and over the inner surface thereof, the interior fabric layer being sized to extend only under the upper part of the exterior fabric layer on the inner surface of the exterior fabric layer to cover at least part of the breasts of a woman wearing the garment;

connecting a pair of side support panels onto inner surfaces of the interior fabric layer, each side support panel being sized to extend only over one lateral area of a torso front of a woman wearing the garment, the lateral areas being adjacent respective lateral sides of the breasts of a woman wearing the garment, each side support panel being made of non-stretch and flexible material for supporting the breasts of a woman wearing the garment, in a medially direction and forwardly; and connecting a pair of tapes to the interior fabric layer to extend along respecti[ng]*ve* medial edges of the side support panels for reinforcing breast support provided by the side support panels.

*21. A garment for extending around a wearer's torso and supporting the wearer's breasts, said garment comprising:*

*a first outer fabric layer configured to encircle the wearer's torso;*

*a second inner fabric layer configured to extend over at least a portion of the wearer's breasts, said first outer*

*fabric layer at least partially overlapping said second inner fabric layer; and*

*a first side support panel and a second side support panel, each of said side support panels being attached to said second inner fabric layer, and each of said side support panels being made of a substantially non-stretch flexible material;*

*at least one seam attachment attached to said second inner fabric layer and attached to at least one of said first side support panel and said second side support panel;*

*wherein said first side support panel and said second side support panel are configured to provide support to the wearer's breasts.*

*22. The garment according to claim 21, wherein said at least one seam attachment is configured to reinforce the attachment of at least one of said first side support panel and said second side support panel to said second inner fabric layer.*

*23. The garment according to claim 21, wherein said at least one seam attachment comprises a tape, stitching or adhesive attachment for attaching at least one of said first side support panel and said second side support panel to said second inner fabric layer.*

*24. The garment according to claim 21, wherein said at least one seam attachment is not visible through said first outer fabric layer.*

*25. The garment according to claim 21, wherein said side support panels are configured to provide wireless support to the wearer's breasts.*

*26. The garment according to claim 21, wherein said second inner fabric layer comprises a single, continuous piece of fabric.*

*27. The garment according to claim 21, wherein said second inner fabric layer comprises at least two pieces of fabric, each of the at least two pieces of fabric being configured to extend over at least a portion of one of the wearer's breasts.*

*28. The garment according to claim 21, wherein said side support panels provide wireless support to the wearer's breasts by pushing the wearer's breasts forward in a direction away from the wearer's torso.*

*29. The garment according to claim 21, wherein said second inner fabric layer is an interior layer configured to be placed against the wearer's skin.*

*30. The garment according to claim 21, wherein said second inner fabric layer includes a front portion configured to extend over at least a portion of the wearer's breasts and a back portion configured to extend over at least a portion of the wearer's back.*

*31. A method of manufacturing a garment for supporting a wearer's breasts, the method comprising the steps of:*

*attaching a first outer fabric layer to a second inner fabric layer such that the first outer fabric layer at least partially overlaps the second inner fabric layer, the first outer fabric layer being configured to encircle the wearer's torso, and the second inner fabric layer being configured to extend over at least a portion of the wearer's breasts;*

*connecting a first side support panel and a second side support panel to the second inner fabric layer, each of the first side support panel and the second side support panel being made of a substantially non-stretch flexible material; and*

*attaching at least one seam attachment to the second inner fabric layer and at least one of the first side support panel and the second side support panel.*

*32. The method according to claim 31, wherein the at least one seam attachment comprises a tape, stitching or adhesive attachment.*

*33. The method according to claim 31, wherein the attachment of the side support panels to the second inner fabric layer enables the garment to wirelessly support the wearer's breasts.*

* * * * *